(12) United States Patent
Lee et al.

(10) Patent No.: US 7,861,312 B2
(45) Date of Patent: Dec. 28, 2010

(54) MP3 PLAYER WITH DIGITAL RIGHTS MANAGEMENT

(75) Inventors: Charles C. Lee, Cupertino, CA (US);
I-Kang Yu, Palo Alto, CA (US);
Abraham C. Ma, Fremont, CA (US);
Ming-Shiang Shen, Taipei Hsien (TW)

(73) Assignee: Super Talent Electronics, Inc., San Jose, CA (US)

( * ) Notice: Subject to any disclaimer, the term of this patent is extended or adjusted under 35 U.S.C. 154(b) by 1004 days.

(21) Appl. No.: 11/668,316

(22) Filed: Jan. 29, 2007

(65) Prior Publication Data
US 2007/0150963 A1    Jun. 28, 2007

Related U.S. Application Data

(63) Continuation-in-part of application No. 09/478,720, filed on Jan. 6, 2000, now Pat. No. 7,257,714, and a continuation-in-part of application No. 11/466,759, filed on Aug. 23, 2006.

(51) Int. Cl.
*G06F 7/04* (2006.01)
*G06F 12/14* (2006.01)
*G06F 21/00* (2006.01)
*H04L 29/06* (2006.01)
*H04L 9/32* (2006.01)
*H04L 9/28* (2006.01)
*H04N 7/167* (2006.01)
*H04K 1/00* (2006.01)

(52) U.S. Cl. .......................... 726/27; 726/31; 713/150; 713/161; 713/165; 713/168; 713/187; 713/189; 380/201; 380/203; 380/227; 380/229; 380/230; 380/239; 380/255; 380/28; 705/51; 705/56; 705/57; 705/59

(58) Field of Classification Search .................. 726/27, 726/31; 713/150, 161, 165, 168, 187, 189; 380/201, 203, 227, 229, 230, 239, 255, 28; 705/51, 56, 57, 59
See application file for complete search history.

(56) References Cited

U.S. PATENT DOCUMENTS

| | | | |
|---|---|---|---|
| 5,050,213 A * | 9/1991 | Shear | 705/53 |
| 5,598,470 A * | 1/1997 | Cooper et al. | 713/165 |
| 5,651,064 A * | 7/1997 | Newell | 705/51 |
| 6,118,873 A | 9/2000 | Lotspiech et al. | |
| 6,167,358 A * | 12/2000 | Othmer et al. | 702/188 |

(Continued)

*Primary Examiner*—Aravind K Moorthy
(74) *Attorney, Agent, or Firm*—g Patent LLC.; Stuart T. Auvinen

(57) ABSTRACT

A portable media player receives encrypted audio files and an encrypted content key from a central license server on the Internet. The media player supports digital rights management (DRM) by storing the encrypted audio file in its flash memory and disabling copying or playing of the audio file after a copy limit has been reached. The copy limit is a rule that is combined with the content key in a transfer key that can be encrypted together by the license server. The license server can detect cloning of the media player by reading a unique player ID from the player and detecting when too many accounts use the same unique player ID. The content key can be generated from polar coordinates of the unique player ID, player manufacturer, and song genre. A fingerprint sensor on the player can scan and compare the user's fingerprints to further detect cloning.

16 Claims, 14 Drawing Sheets

U.S. PATENT DOCUMENTS

| | | |
|---|---|---|
| 6,327,376 B1 * | 12/2001 | Harkin ........................ 382/124 |
| 6,550,011 B1 * | 4/2003 | Sims, III ..................... 713/193 |
| 6,754,642 B2 | 6/2004 | Tadayon et al. |
| D500,485 S | 1/2005 | Deguchi |
| 6,968,459 B1 * | 11/2005 | Morgan et al. ............... 713/189 |
| 7,065,506 B1 * | 6/2006 | Phillipo et al. ................ 705/58 |
| 7,120,250 B2 | 10/2006 | Candelore |
| 7,143,067 B1 * | 11/2006 | Cheston et al. ............... 705/59 |
| 2006/0183505 A1 | 8/2006 | Willrich |
| 2006/0195909 A1 | 8/2006 | Boswell et al. |
| 2006/0198519 A9 | 9/2006 | Candelore |
| 2006/0206724 A1 | 9/2006 | Schaufele et al. |
| 2006/0253894 A1 | 11/2006 | Bookman et al. |
| 2006/0258289 A1 | 11/2006 | Dua |
| 2006/0259765 A1 | 11/2006 | Song et al. |
| 2006/0259770 A1 | 11/2006 | Peinado |
| 2006/0265560 A1 | 11/2006 | Geerlings |
| 2006/0277598 A1 | 12/2006 | Ahn |

* cited by examiner

MP3 PLAYER WITH DIGITAL RIGHTS MANAGEMENT

RELATED APPLICATION

This application is a continuation-in-part (CIP) of the application for "Electronic Data Storage Medium with Fingerprint Verification Capability", U.S. Ser. No. 09/478,720, filed Jan 06, 2000, and also "Flash Memory Controller For Electronic Data Flash Card", U.S. Ser. No. 11/466,759, filed on Aug. 23, 2006, which is a CIP of "System and Method for Controlling Flash Memory", U.S. Ser. No. 10/789,333, filed Feb. 26, 2004, now abandoned.

This application also related to "Dual-Mode Flash Storage Exchange that Transfer Flash-Card Data to Removable USB Flash Key-Drive with or without a PC Host", Ser. No. 10/707,835 A1, filed Jan 15, 2004, now U.S. Pat. No. 6,993,618 and "USB smart switch with packet re-ordering for interleaving among multiple flash-memory endpoints aggregated as a single virtual USB endpoint", Ser. No. 10/707,276 A1, filed Dec. 2, 2003, now U.S. Pat. No. 7,073,010.

FIELD OF THE INVENTION

This invention relates to portable storage and playback devices, and more particularly to an electronic data storage medium device with digital rights management (DRM) security for audio/video files.

BACKGROUND OF THE INVENTION

Computer files can be carried from one computer to another using floppy disks or diskettes. Data files stored on a floppy disk or diskette may require a password for access, or may use encryption to secure the data within the file. Confidential documents can be delivered over a network by adding safety seals and impressions. However, the confidential data is at risk due to breaking of the passwords, encryption codes, safety seals and impressions, thereby resulting in unsecure transfer of the information.

More recently, files are often transported by portable devices such as Universal-Serial-Bus (USB) key drives, memory cards, and music players such as Apple Computer's iPod and other MP3 devices. However, security of files on such devices is problematic. Illegal copies of copyrighted files are easy to make and distribute to potentially millions of other users.

The parent application, U.S. Ser. No. 09/478,720, disclosed an electronic data storage medium that had fingerprint verification capability. FIG. 1 is a schematic circuit block diagram illustrating an electronic data storage medium disclosed in the parent application.

The electronic data storage medium with fingerprint verification capability can be accessed by external computer 9 using input/output interface circuit 5, which may use a Personal-Computer Memory Card International Association (PCMCIA), RS-232, or similar interface. The electronic data storage medium can be located inside or outside of the external computer.

The electronic data storage medium is packaged in card body 1, and includes processing unit 2, memory device 3, fingerprint sensor 4, input/output interface circuit 5, display unit 6, power source 7, and function key set 8.

Memory device 3 can be a flash memory device that stores data files. Fingerprint sensor 4 scans a fingerprint of a user to generate fingerprint scan data. Processing unit 2 connects to other components and can operate in various modes, such as a programming mode, a data retrieving mode, and a data-resetting mode. Power source 7 supplies electrical power to processing unit 2. Function key set 8 allows the user to input a password that is verified by processing unit 2. Display unit 6 shows the operating status of the electronic data storage medium.

The electronic data storage medium packaged in card body 1 includes processing unit 2, memory device 3, and input/output interface circuit 5. While useful, various additions can increase the usefulness of the device. For example, audio playback can be supported. When coupled with fingerprint sensor 4, the audio playback can have added security features.

Memory device 3 may be a solid-state flash memory rather than a rotational hard drive. Using flash memory provides lighter weight, lower power, and more rigidity than the rotational hard drive. Data files such as audio, video, and text may need security. Also, alternative features such as audio/video capability may replace the fingerprint verification feature on some alternatives of the device.

What is desired is an electronic data storage device with audio features. An audio device that provides security and digital rights management (DRM) is desirable.

DETAILED DESCRIPTION

The present invention relates to an improvement in digital rights management (DRM) for portable electronic storage and audio devices. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
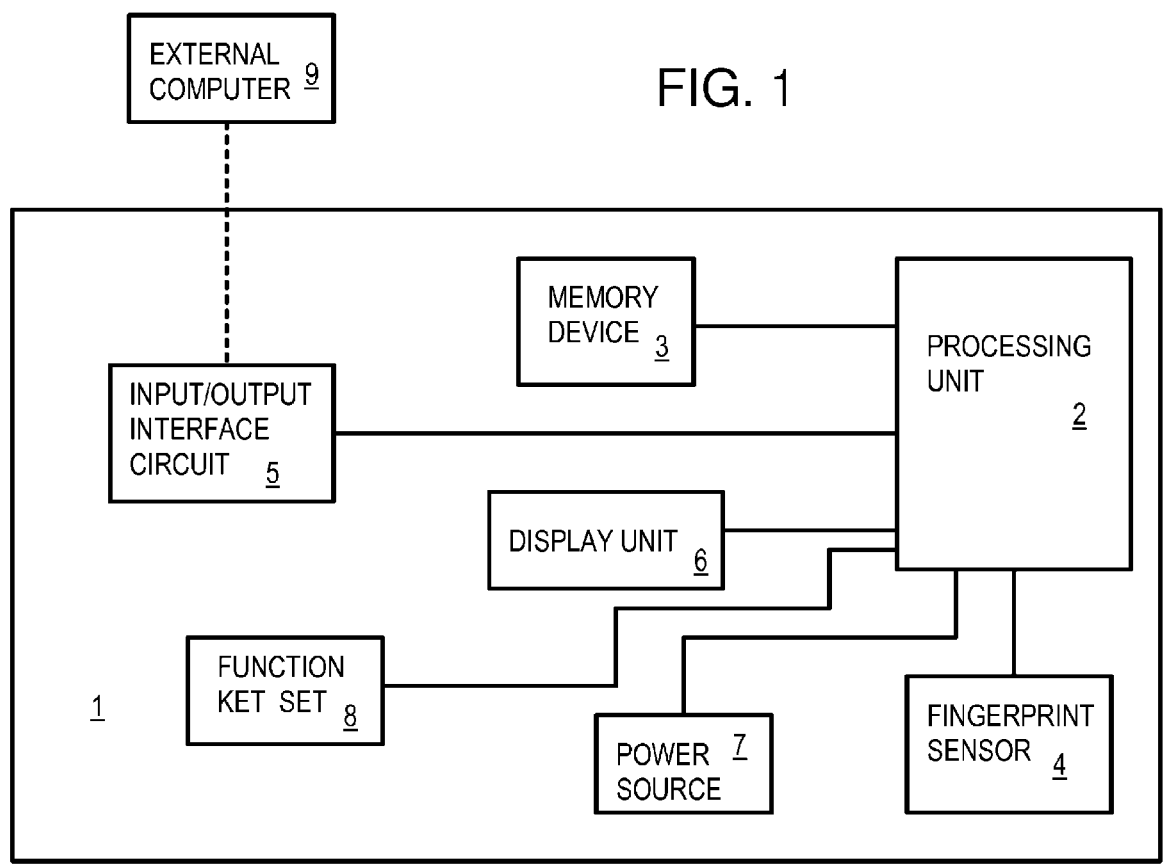
FIG. 1 is a schematic circuit block diagram illustrating an electronic data storage medium disclosed in the parent application.
Figure 2:
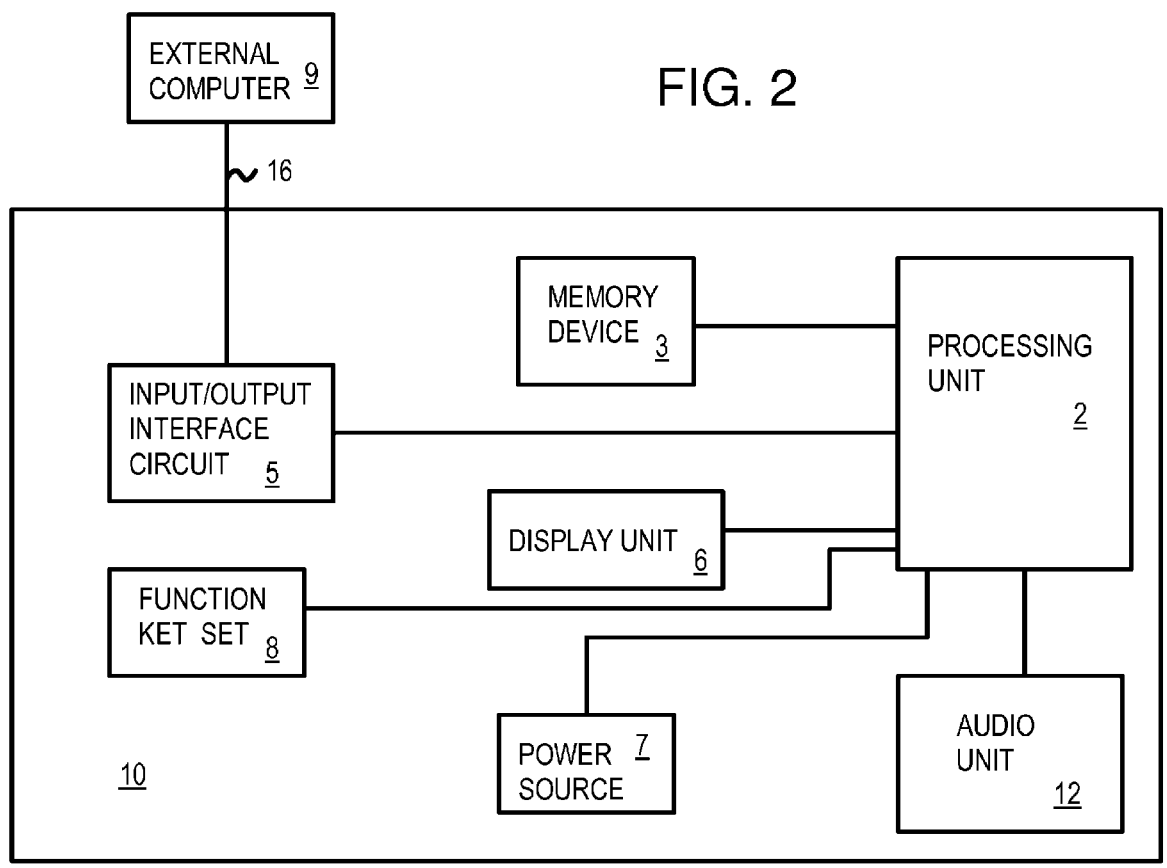
FIG. 2 shows an electronic data storage medium device with audio capability.

FIG. 2 shows an electronic data storage medium device with audio capability. Electronic data storage medium device 10 has audio capability and can be accessed by external computer 9, and includes card body 1, processing unit 2, memory device 3, audio unit 4, input/output interface circuit 5, display unit 6, power source 7, and function key set 8.

Memory device 3 may be a flash memory device that is mounted on card body 1, and stores data files such as MP3 and WMA files. Memory device 3 may be flash cards such as MMC, MS, SD, CF, USB, PCIE, etc. Data files stored on memory device 3 can be audio files, picture files, video files, or text files.

Audio unit 4 is able to generate music or sound from audio files during a playback of the audio files. A headphone jack or a speaker can be supplied to allow a user to hear the generated sound from audio unit 4.

Input/output interface circuit 5 may be a Universal-Serial-Bus (USB) or equivalent interface that is activated to establish communication with the external computer 9. Input/output interface circuit 5 may include a USB physical layer, a USB link layer, reset circuitry and a voltage regulator system. The physical layer generates and receives signals according to the USB physical signal standards to communicate with the external computer. The link layer interprets the physical signals as USB bus transactions and performs data serial/deserialization.

In some embodiments, input/output interface circuit 5 may be activated to establish USB Bulk Only Transport (BOT) communications with host computer 9 via the interface link. There are four types of USB software communication data flow between a host computer and the USB device: control, interrupt, bulk, and isochronous. Control transfer is the data flow over the control pipe from the host computer to the USB device to provide configuration and control information to a USB device. Interrupt transfers are small-data, non-periodic, guaranteed-latency, device-initiated communication typically used to notify the host computer of service needed by the USB device. Movement of large blocks of data across the USB interface circuit that is not time critical may use Bulk transfers. Isochronous transfers provide periodic, continuous communication between the host computer and the USB device.

Two data transfer protocols commonly supported by USB interface circuits are the Control/Bulk/Interrupt (CBI) protocol and the Bulk-Only Transfer (BOT) protocol. CBI transport is used with full-speed floppy disk drives, but is not used in high-speed capable devices, or in devices other than floppy disk drives (according to USB specifications). BOT is a more efficient and faster transfer protocol than CBI protocol because BOT transport of command, data, status relies on Bulk endpoints in addition to default Control endpoints.

Processing unit 2 may be a microprocessor or a digital signal processor and may include a ROM, RAM and/or local flash memory. Various levels of integration with other components in electronic data storage medium device 10 are possible, such as a single chip integrated circuit, or a single MCP (Multi-Chip Package) package. Processing unit 2 may operate in a programming mode that activates input/output interface circuit 5 to receive a data file from the host computer, and to store the data file in the flash memory device. Transfers to host computer 9 over bus 16 can be achieved using a retrieving mode.

Processing unit 2 may compare security data with the reference data stored in memory device 3 to activate input/output interface circuit 5 to transmit the data file to external computer 9 only when the security data matches the reference data.

Figure 3:
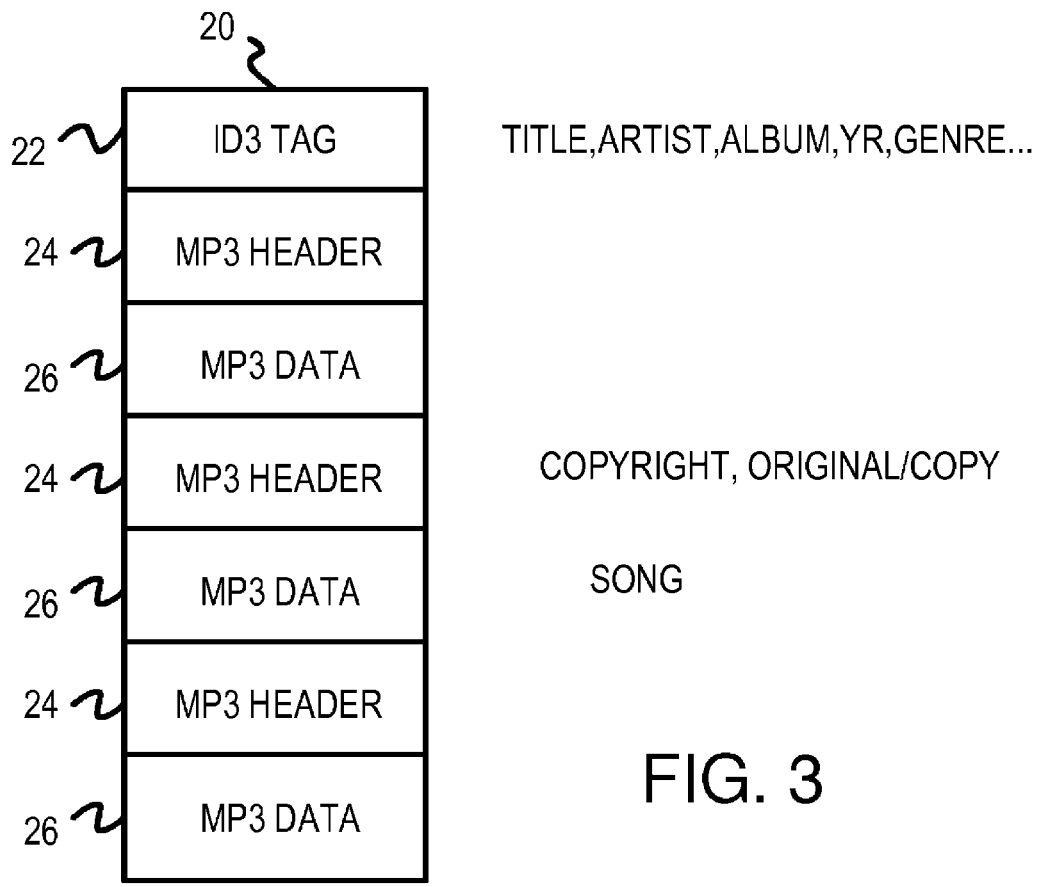
FIG. 3 shows an audio file.

FIG. 3 shows an audio file. Audio file 20 is compressed in a motion-picture-experts group standard 3 (MPEG-3) format that is more commonly referred to as MP3 . The actual music data is store in one or more MP3 data fields 26, which are each preceded by MP3 header field 24. MP3 header field 24 contains information on the song, such as copyright and original/copy flags that indicate when the song is copyrighted, and whether the MP3 data is an original or a copy. Other information may also be present in MP3 header field 24, such as the song title, artist, etc, or a portion of it, from tag field 22.

Tag field 22 contains information on one or more songs in audio file 20. Information may include the title, artist, album, year, genre, and comments. Tag field 22 may be the first 128 bytes of audio file 20, or may have some other size and location.

Although such copyright information is available in MP3 formatted audio files, generally low-end portable media players do not provide much or any copyright protection, or rely on software on the PC for copyright protection. If the contents of the data files are entertainment-related such as video, music, or electronic books, artists and copyright owners may want to limit the distribution of the contents by limiting copies distributed or not allowing duplication of the contents. At present, the files can be easily copied from floppy disk, CD-ROM etc. without any problem. It is desirable to limit the duplication of audio-file contents, and to make sure that the newly created contents will be protected also.

Figure 4:
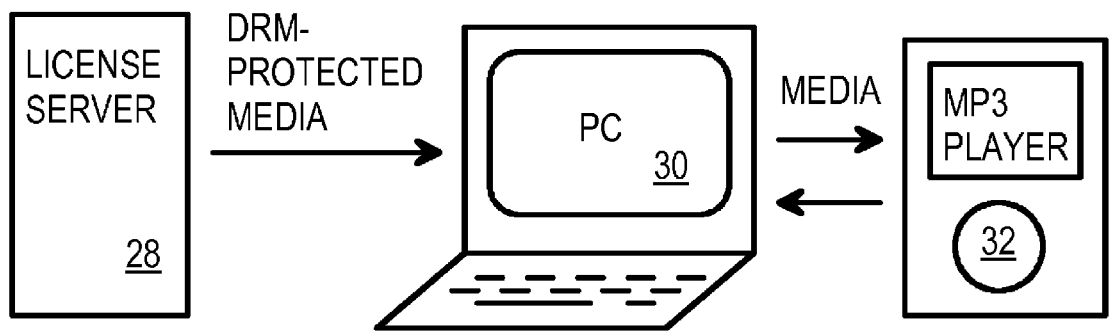
FIG. 4 highlights transferring audio files to an MP3 player using a license server.

FIG. 4 highlights transferring audio files to an MP3 player using a license server. MP3 player 32 can be an electronic data storage medium with an audio unit such as shown in FIG. 2. MP3 player 32 can be connected to host PC 30 through an interface such as a USB. Host PC 30 connects to license server 28 over a network connection such as the Internet.

Media from license server 28 includes audio files and other media that is protected using digital rights management (DRM). Software on host PC 30 communicates with MP3 player 32 to ensure that additional copies of the media from license server 28 are not generated. License server 28 sends media files in an encrypted format that requires a cryptographic key to unlock the content for playing on MP3 player 32. The copyright rules are also encrypted to prevent tampering.

Figure 5:
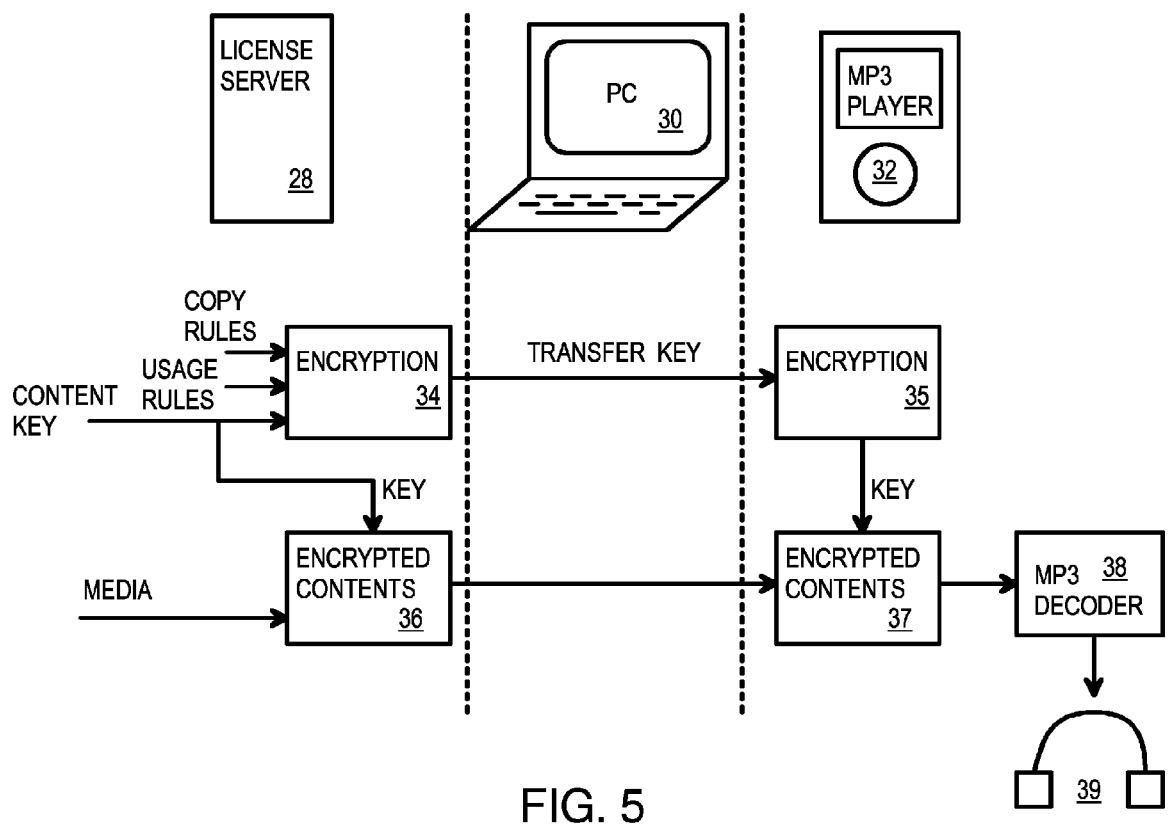
FIG. 5 shows an overview of encryption and transfer of media files for playing on a MP3 player.

FIG. 5 shows an overview of encryption and transfer of media files for playing on a MP3 player. Media files such as audio songs are encrypted by license server 28 using a content key. Encrypted content 36 are sent from license server 28 over public networks such as the Internet to host PC 30. Since the media content is sent as encrypted content 36, the media cannot be intercepted and copied in a playable form by intermediate routers on the public Internet, assuming the content key is not known.

The content key used by license server 28 to generate encrypted content 36 is combined with copy and use rules and the combination is input to encryptor 34. A transfer key is generated that contains the content key, copy, and use rules. This transfer key can be safely sent over public networks to host PC 30, since the transfer key is itself encrypted.

Decryptor 35 on MP3 player 32 decrypts the transfer key to extract the copy and use rules and the content key. The content key is used to unlock received encrypted content 37 to generate playable audio. The playable audio is sent to MP3 decoder 38, which generates audio sounds from the MP3 content in the song file. The audio may be heard by a user over headphones 39 or another listening device.

Software running on host PC 30 may be a specially-developed application for transferring encrypted music, photos and videos between a Service Provider on license server 28 and host PC 30, or between host PC 30 and portable devices such as MP3 player 32. The service provider only works with the user's computer equipped with this specially-developed application for downloading the purchased files. The two sides can use a simple password (Non-cryptographic techniques) or use cryptographic techniques wherein both sides must each convince the other before any file transfer.

The downloaded files may be stored in a hidden folder together with a proprietary database that can only seen by the specially-developed application. Digital Rights Management (DRM) can be implemented through the specially-developed software. The Digital Rights Management data can include limitations such as how many times each encrypted file can be copied to portable devices or to another host, or a number of times or length of time the file can be played.

The audio/video files normally purchased over the Internet have many audio compression formats, such as MP3, Windows Media Audio (WMA) and Advanced Audio Coding (AAC). The service provider encrypts these files before downloading by users.

Another special developed application is used by MP3 player 32. For those encrypted files, transfers only occur when both sides are equipped with the special developed applications. Host PC 30 and MP3 player 32 need to convince each other before transfers of files occur between them. In MP3 player 32, these files may be stored in a hidden folder together with a proprietary database. A host without the specially-developed software is not able to see the hidden folder.

The audio unit of MP3 player 32 has decryption capability to decrypt the stored encrypted file. It also has decoders such as MP3 and AAC to play the decrypted music file through the audio jack.

Figure 6:
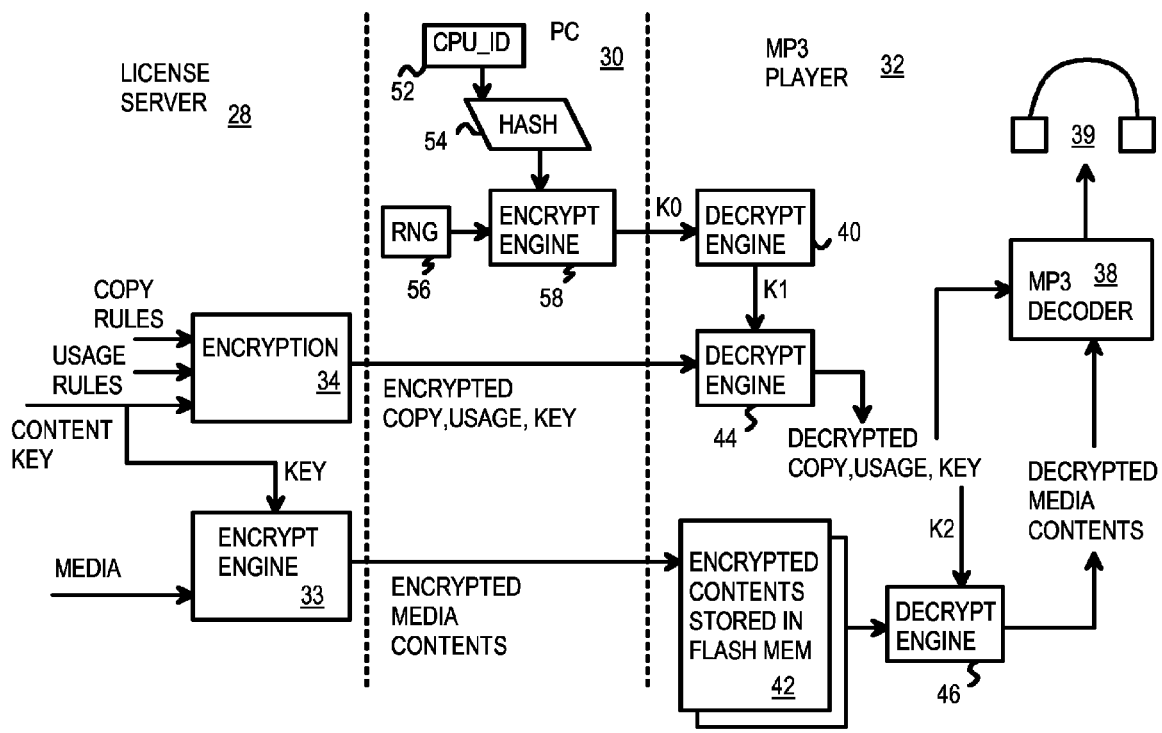
FIG. 6 shows more detail of encryption and transfer of media files for playing on a MP3 player.

FIG. 6 shows more detail of encryption and transfer of media files for playing on a MP3 player. Encryption engine 33 generates encrypted media content using a content key. The encrypted media content can safely be sent over public networks to host PC 30 and then transferred to flash memory 42 on MP3 player 32. Flash memory 42 stores media as encrypted content. The encrypted media content is not decrypted until playback, when decryption engine 46 uses a recovered content key K2 to unlock the audio content, which is sent as playable audio to MP3 decoder 38. MP3 decoder 38 generates audio sounds from the MP3 content in the song file, which may be heard by a user through headphones 39.

MP3 player 32 does not retain a copy of the playable audio in flash memory 42. Instead, the playable audio is streamed to MP3 decoder 38 from decryption engine 46 with only temporary buffering such as by a FIFO. Thus additional copying of the DRM-protected media from license server 28 is prevented.

The content key used by encryptor 33 on license server 28 to generate the encrypted content is combined with copy and use rules and the combination is input to encryptor 34. A transfer key is generated that contains the content key, copy, and use rules. This transfer key can be safely sent over public networks to host PC 30, since the transfer key is itself encrypted.

Decryption engine 44 receives the encrypted transfer key from license server 28 and uses a local key K1 to unlock the contents of the transfer key. The recovered content key K2, along with the copy and use rules are extracted from the received transfer key by decryption engine 44.

In order to decrypt the transfer key successfully, decryption engine 44 must use the same (or complementary) encryption as encryptor 34. The encryption routines could be fixed in both encryptor 34 and decryption engine 44, but then all MP3 player 32 devices would have the same internal key and be prone to illegal cloning, allowing for illegal media copies. Instead, each MP3 player 32 can have a different internal key K1. License server 28 can keep track of these internal keys K1 for different users, and encode each transfer key using the user's internal key, or its complement (such as with public-private key pairs).

The user's internal key K1 is initialized by host PC 30, which has a unique CPU identifier or CPU_ID. CPU ID 52 on host PC 30 is hashed by hash engine 54 to generate a key to encryption engine 58. Random number generator 56 generates a random or a pseudo-random number that is input to encryption engine 58, generating a unique host key K0.

Host key K0 generated by host PC 30 is sent to MP3 player 32. Decryption engine 40 uses host key K0 to generate local key K1. Local key K1 is then stored and used for unlocking all transfer keys received from license server 28.

When host key K0 is generated, it can be sent to license server 28 so that encryptor 34 can use this host key K0 when generating transfer keys. Alternately, CPU ID 52 and the random number from random number generator 56 could be sent to license server 28, and license server 28 could generate host key K0 from knowledge of the hash and encryption functions performed by hash engine 54 and encryption engine 58.

Since host key K0 is only generated once, and only sent from host PC 30 to MP3 player 32 and to license server 28 once, such as at account initialization, there is less chance of interception and hacking of host key K0. Transfer keys are sent more frequently, such as for each song purchased, allowing a hacker more opportunities to be successful. However, each transfer key is different, since different content keys are used for different purchase sessions.

One security problem is cloning of MP3 player 32. Different MP3 players can be plugged into the same host PC 30 and songs copied from host PC 30 to several different MP3 players 32, effectively making many copies of the same media file. To combat cloning, each MP3 player 32 can be uniquely identified or personalized.

Figure 7:
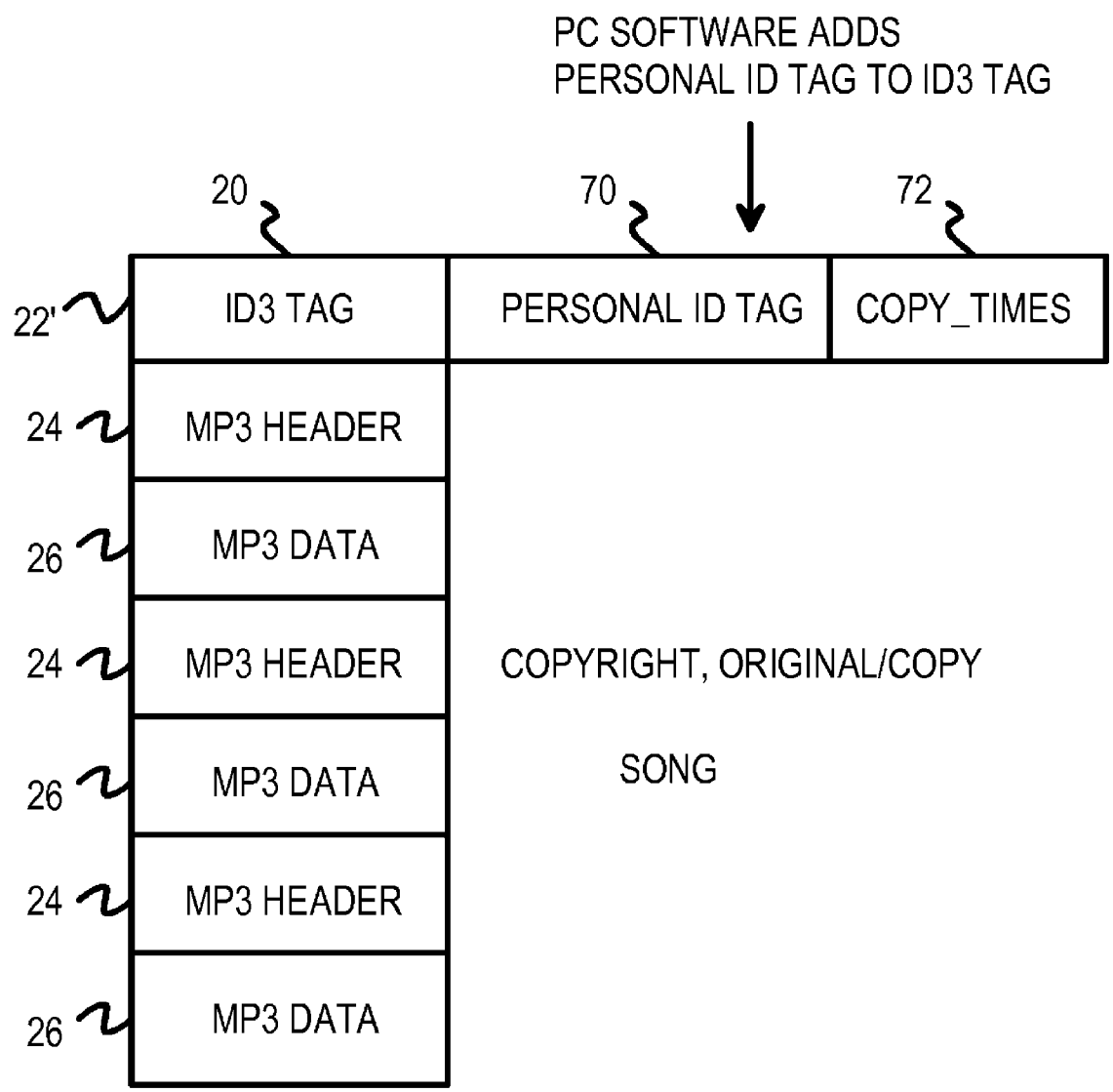
FIG. 7 shows a media file with a personal ID tag attached by the host PC.

FIG. 7 shows a media file with a personal ID tag attached by the host PC. Audio file 20 contains encrypted media in MP3 data fields 26 that are preceded by MP3 header fields 24. The host PC modifies tag field 22 for audio file 20 by attaching additional fields 70, 72 to tag field 22.

Personal ID tag field 70 contains a personal ID that is generated by host PC 30 and was previously pre-loaded into MP3 player 32. This personal ID is different for different MP3 players 32. Copy rules field 72 is also added to audio file 20. Copy rules field 72 contains copy and use information about the songs in audio file 20, such as a limit to a number of copies that can be made, or a number of times the song can be played before being disabled. These can be the same as the copy and use rules sent with the transfer key from the central license server, or can be modified from them.

A counter can be included in field 72 that indicates a number of times that audio file 20 may be copied. Thus counter is decremented for each copy made. Once the counter reaches zero, no further copies are allowed.

Field 72 can also indicate a number of times audio file 20 can be used. Copies may not be allowed, but a usage limit is set, such as for 10 plays and 0 copies. A play counter can be decremented for each time that audio file 20 is played on MP3 player 32, and once this play counter reaches 0 further playback is disabled. For audio books or e-books, the play counter could indicate a time period, such as 14 days for an e-book checked out of a public library. The play counter could then be decremented each day.

Figure 8:
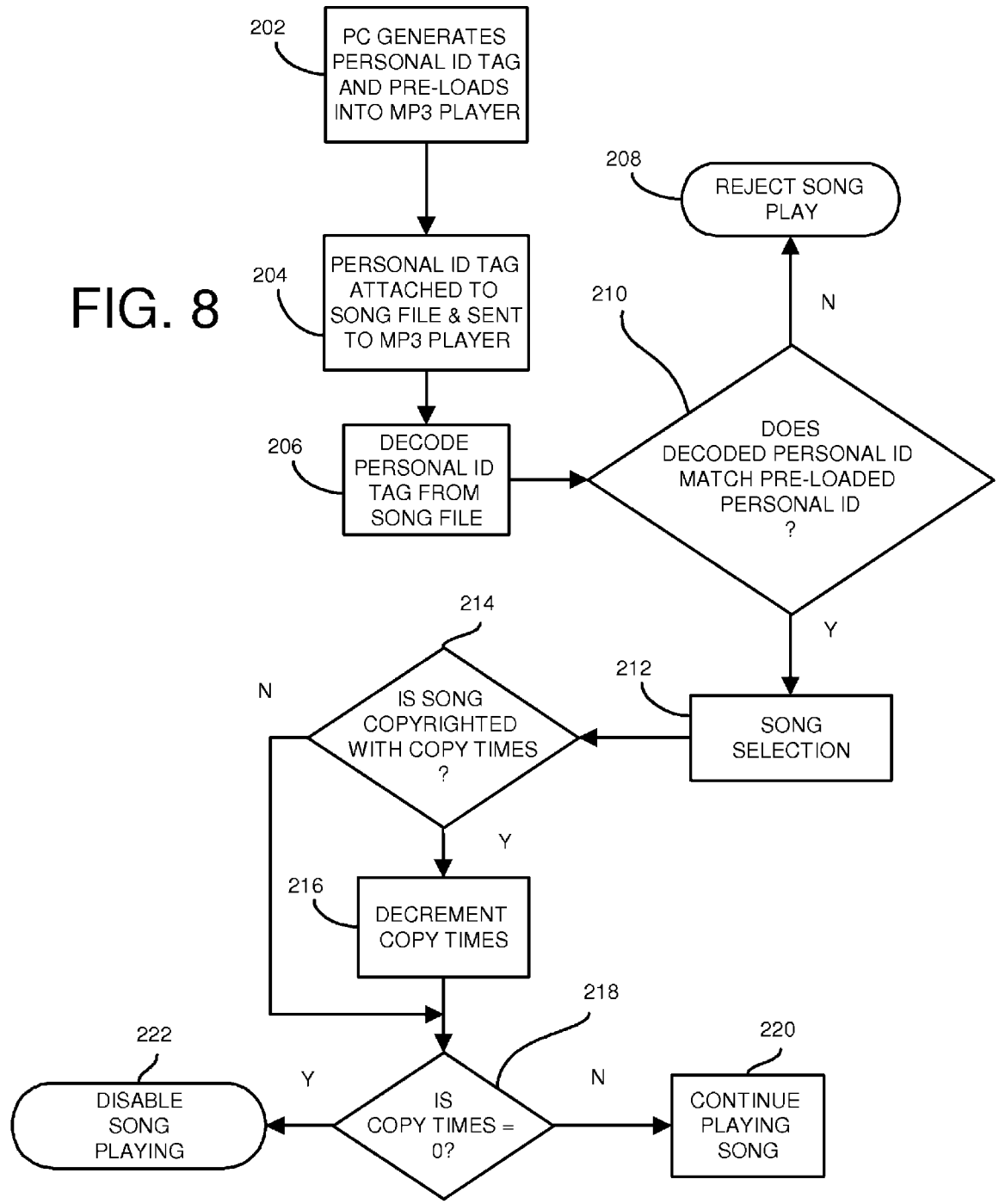
FIG. 8 is a flowchart of using personal ID tags to prevent unauthorized copying.

FIG. 8 is a flowchart of using personal ID tags to prevent unauthorized copying. When the MP3 player is connected to the host PC for the first time, the host PC generates a personal ID tag for that MP3 player. This personal ID tag is pre-loaded into the MP3 player, step 202.

Each time an audio file is downloaded from the license server, the host PC intercepts the file and attaches the personal ID tag to the song's tag, step 204. The audio file with the attached personal ID tag is then sent from the host PC to the MP3 player. The MP3 player decodes or reads the personal ID tag from the audio file header, step 206, and compares the personal ID tag read from the newly-received audio file to the preloaded personal ID stored in the MP3 player, step 210. When the personal ID's do not match, step 210, then the song is not allowed to play on the MP3 player, step 208. An illegal copy was made, such as by copying the file from host PC 30 to another host, or an attempt to copy the same audio file to more than one MP3 player 32 connected to the same host PC 30.

When the preloaded and audio-file's personal ID match, step 210, then the audio file is valid for this MP3 player. The user selects a song for playing from the audio file, step 212. The MP3 header field for the selected song is read to determine the copyright information. When the MP3 header field indicates that the song is copyrighted, and the song has a limit to a number of copies that are allowed, step 214, the copy counter is decremented to indicate that a copy is being made, step 216.

When the copy counter reaches 0, step 218, then song playing is disabled, step 222. Otherwise, the MP3 data field is decrypted and the playable audio data sent to the MP3 decoder for playing to the user, step 220.

Figure 9A:
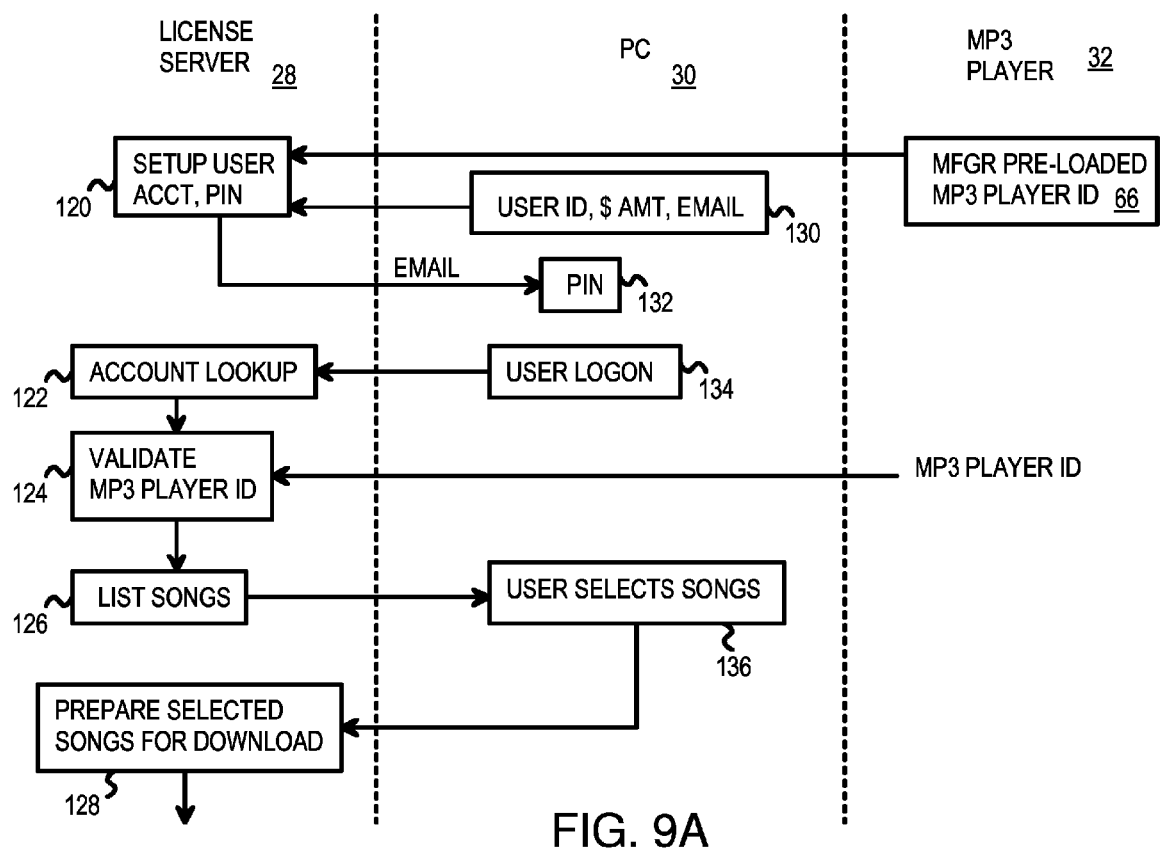
FIGS. 9A-B show account and MP3 player setup, song downloading and playing for a secure digital rights management (DRM) system.
Figure 9B:
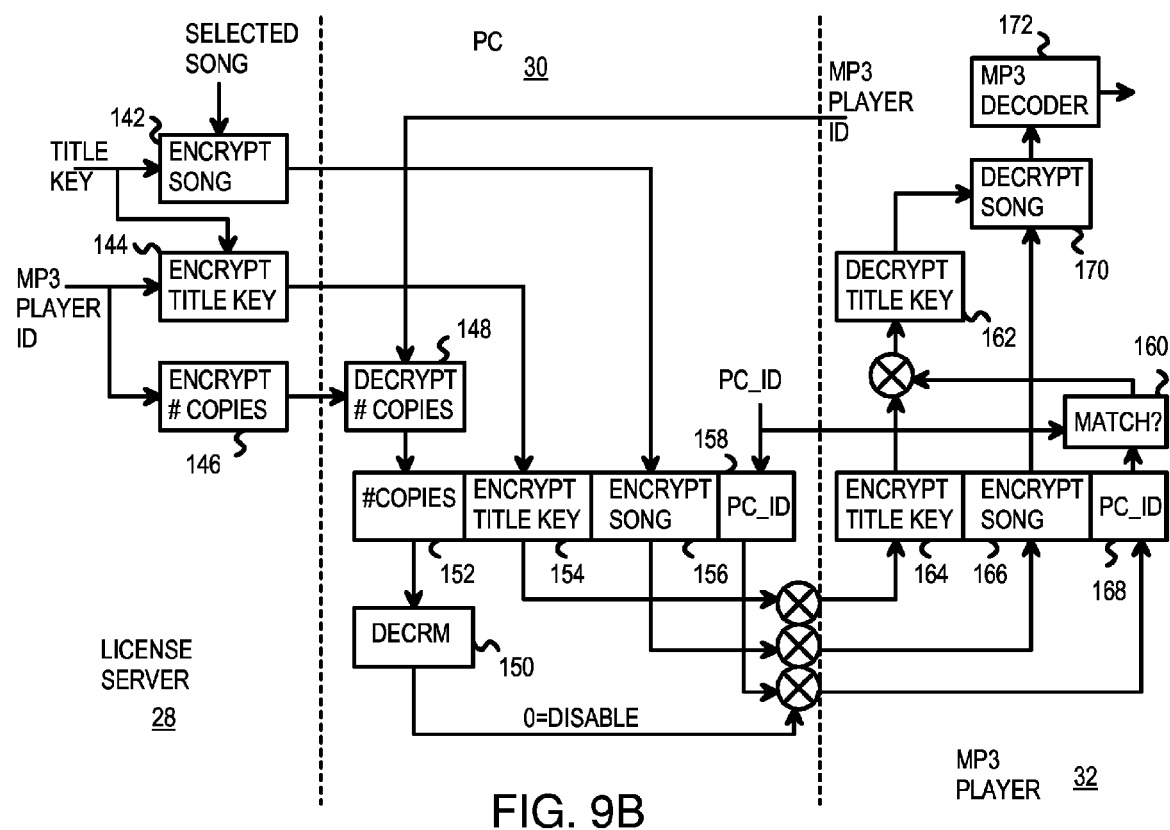

FIGS. 9A-B show account and MP3 player setup, song downloading and playing for a secure digital rights management (DRM) system. The manufacturer of MP3 player 32 pre-loads a unique MP3 player ID 66 into the device, or software on host PC 30 pre-loads this unique MP3 player ID 66 into MP3 player 32. A user connects MP3 player 32 to host PC 30, such as through a USB cable, and activates special application software on host PC 30 that reads unique MP3 player ID 66 from MP3 player 32.

The user connects to license server 28 using the software on host PC 30 and establishes an account 120 by sending unique MP3 player ID 66 to license server 28. A user ID, account password, email address, and payment information may be provided by the user. Personal identifier number (PIN) 132 or other acknowledgement number is generated by license server 28 and emailed or otherwise sent to host PC 30. PIN 132 could also be a user-generated password or a validation code.

The user logs on to license server 28 when desiring to download a song. Logon 132 is responded to by license server 28 by account lookup 122 to find the user's account, and device ID validation 124 that reads unique MP3 player ID 66 from MP3 player 32 and compares it to the unique MP3 player ID stored in the user account information on license server 28. The user is prevented from copying songs to a different device, unless that device is also registers and its unique MP3 player ID 66 received. Thus copying songs to many different MP3 player devices is inhibited.

The songs available for downloading are listed to the user, 126, and the user selects one or more songs for downloading, 136. The selected songs are prepared for downloading 128 by license server 28.

In FIG. 9B, the song selected by the user is encrypted by song encryptor 142, which uses a title key that is generated by license server 28. The title key is itself encrypted by key encryptor 144, using unique MP3 player ID as the encrypting key. Unique MP3 player ID 66 was obtained from MP3 player 32 during account setup (FIG. 9A) and stored in license server 28.

The number of copies allowed, or other copy rules, are encrypted by copy encryptor 146, which also uses unique MP3 player ID as the encrypting key. The encrypted song, title key, and copy rules are sent from license server 28 to host PC 30. Host PC 30 stores encrypted song 156 and encrypted title key 154 and does not need to decrypt them. However, the encrypted copy rules are decrypted by rule decryptor 148 using unique MP3 player ID 66 read from MP3 player 32 as the decryption key. The recovered number of copies is stored as copy rules 152, and decremented by decrementor 150 for each copy made by host PC 30 of encrypted song 156.

When the number of copies remaining reaches zero, copying is disabled by host PC 30 and encrypted song 156 cannot be copied to MP3 player 32. Otherwise encrypted song 156, encrypted title key 154, and PC ID 158 are copied to MP3 player 32 and stored as encrypted song 166, encrypted title key 164, and PC ID 168 in the flash memory of MP3 player 32.

PC ID 158 can be the unique CPU ID from the processor in host PC 30, a hashed ID, or some other value that identifies host PC 30. This PC ID is also pre-loaded by host PC 30 on MP3 player 32 and stored on MP3 player 32. PC ID 158 may also be sent to license server 28 such as during account logon.

When PC ID 168 does not match the pre-loaded PC ID in MP3 player 32, match 160 blocks playback by preventing decryption of encrypted title key 164. Otherwise, when PC ID's match, encrypted title key 164 is decrypted by decryptor 162 to obtain the title key that unlocks encrypted song 166 using song decryptor 170. MP3 decoder 172 can then playback the song to the user.

Figure 10:
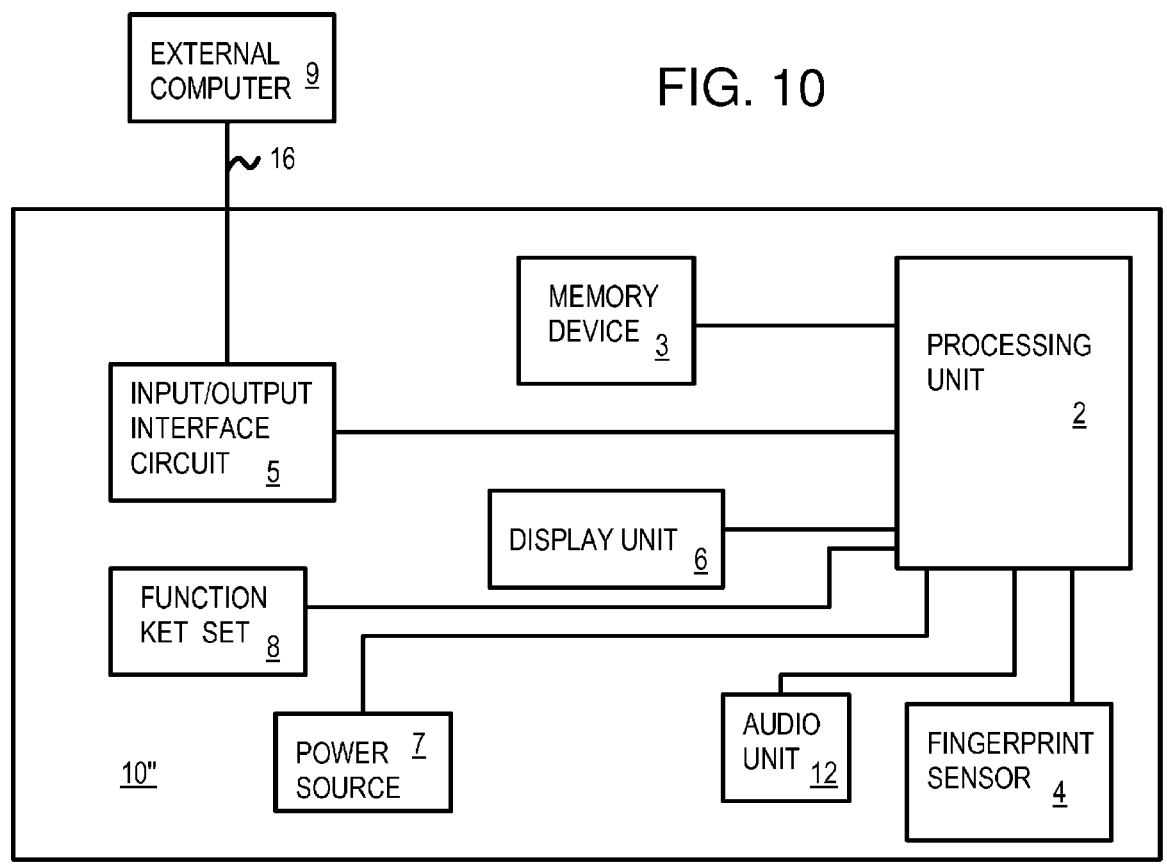
FIG. 10 shows an electronic data storage medium device with audio and fingerprint scanning capability.

FIG. 10 shows an electronic data storage medium device with audio and fingerprint scanning capability. Electronic data storage medium device 10" has audio capability and can function as MP3 player 32 described earlier.

Electronic data storage medium device 10" can be accessed by external computer 9, and includes card body 1, processing unit 2, memory device 3, audio unit 4, input/output interface circuit 5, display unit 6, power source 7, and function key set 8 as described earlier for FIG. 2.

Processing unit 2 connects to other components and can operate in various modes, such as a programming mode, a data retrieving mode, and a data-resetting mode. Power source 7 supplies electrical power to processing unit 2. Function key set 8 allows the user to input a password that is verified by processing unit 2. Display unit 6 shows the operating status of the electronic data storage medium.

Fingerprint sensor 4 scans a fingerprint of a user to generate fingerprint scan data. The fingerprint scan can be used to verify a human user of the MP3 player. Theft of the MP3 player can be deterred since other users cannot use the MP3 player since their fingerprints would not match that of the authorized user.

The unique MP3 player ID can be enhanced to include fingerprint data, or the fingerprint data can be separately stored and authenticated. Playback could be allowed without a valid fingerprint scan, while copying of songs could require a valid fingerprint scan, or both playback and copying could require fingerprint scans.

Figure 11:
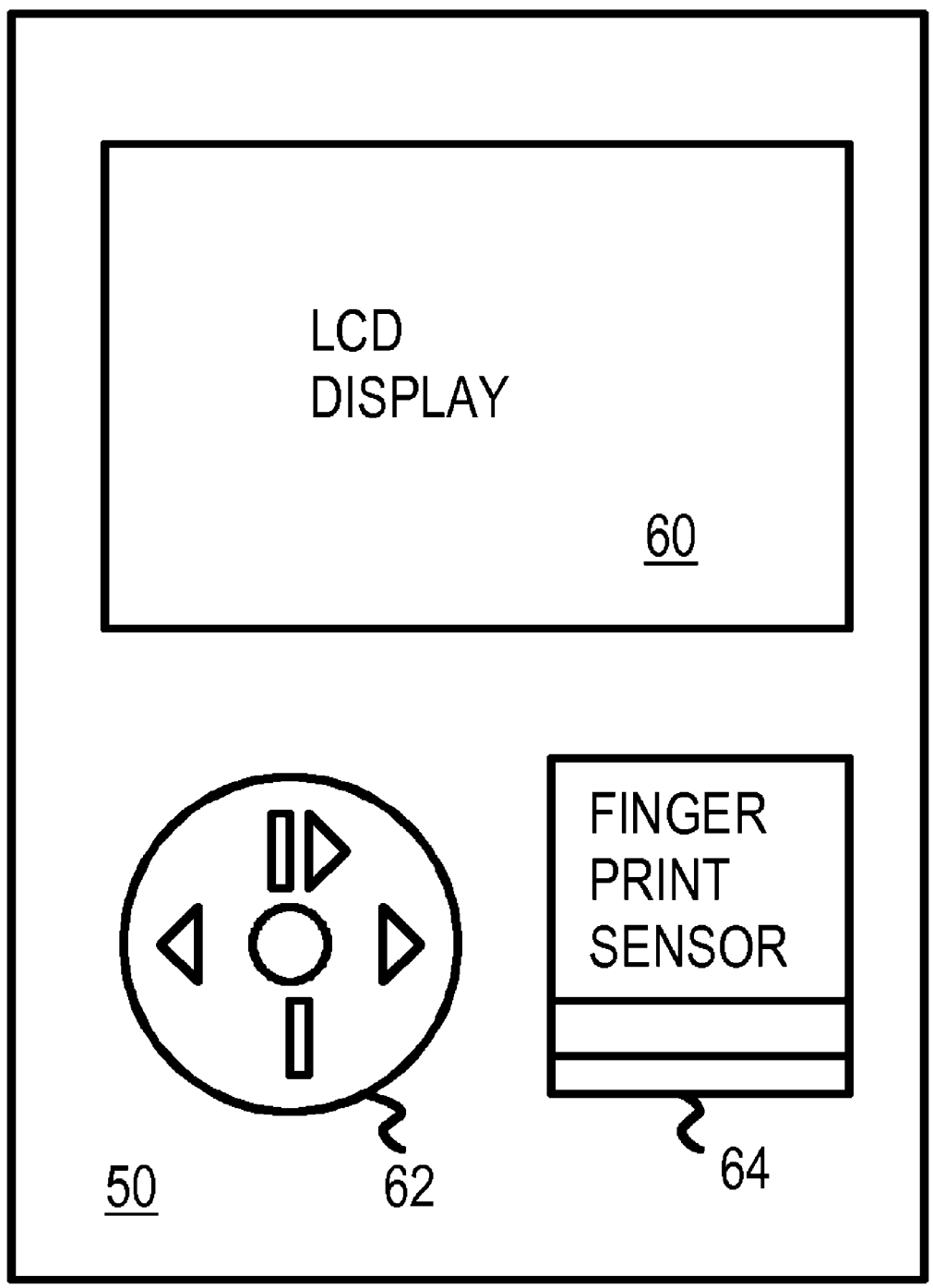
FIG. 11 shows a MP3 player with a fingerprint sensor.

FIG. 11 shows a MP3 player with a fingerprint sensor. MP3 player 50 can be an embodiment of electronic data storage medium device 10' shown in FIG. 10. Dial pad 62 can be pushed upward, downward, to the right or to the left, and inward at the center to select from a menu displayed on display 60. Thus dial pad 62 can act as the function key set. Audio functions such as volume control, play, rewind, skip forward, pause, etc. can be activated by dial pad 62.

Fingerprint sensor 64 allows the user to be authenticated. The user presses his thumb or other finger into fingerprint sensor 64 so that a scan can be made. The scan of the user's fingerprint can be compared to a stored fingerprint to validate the user and to prevent other uses from playing songs with this device. Cloning of the device and its songs is also hindered, since other users have different fingerprints.

Figure 12:
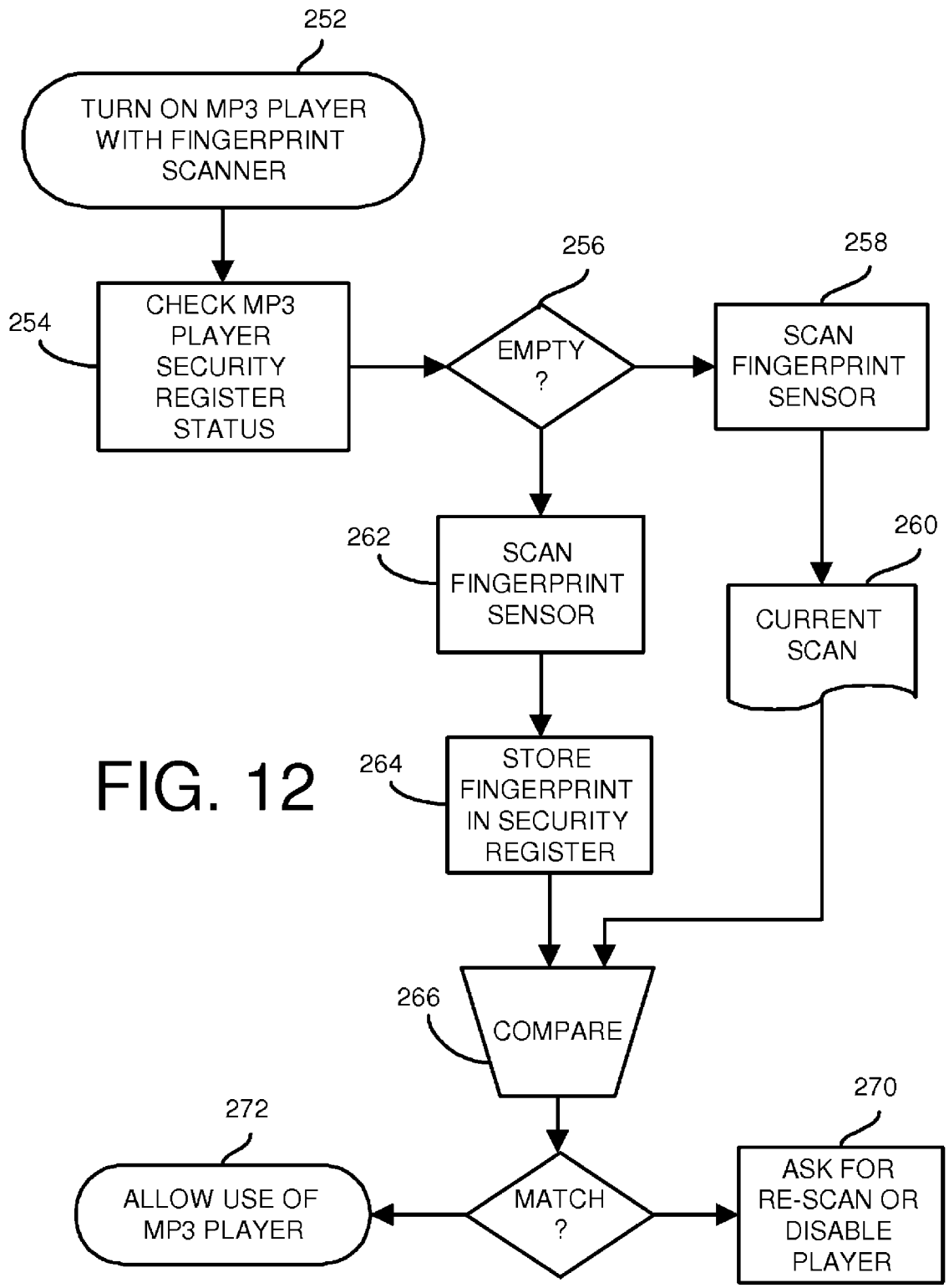
FIG. 12 is a flowchart of fingerprint verification using a MP3 player with a fingerprint sensor.

FIG. 12 is a flowchart of fingerprint verification using a MP3 player with a fingerprint sensor. When the MP3 player is first turned on after purchase, or is erased and reset, step 252, the security status register on the MP3 player is read, step 254. When the security status register is empty or in the initial cleared state, step 256, then the user's fingerprint is scanned, step 262, and that scan is stored in the security status register or in another register, step 264. This stored fingerprint scan is indefinitely retained until the device is reset. All songs are erased when the device is reset.

Later, when the MP3 player is activated by the user to play a song or to download a file, the security status register is not empty, step 256. The user's fingerprint is scanned, step 258, as current fingerprint scan 260. Current fingerprint scan 260 is compared to the stored fingerprint in the security status register, step 266.

When the stored and current fingerprints match, step 266, then the user is validated and the user can play or copy songs using the MP3 player, step 272. However, when the stored and current fingerprints do not match, step 266, then the user is not validated. The user is prompted to re-scan his fingerprint, step 270. The routine can be repeated several times until the user is validated. Playing and copying songs is disabled until the user can be validated. After some number of attempts, user validation can be halted and the user required to reset the device, or wait for a period of time before re-trying.

Figure 13:
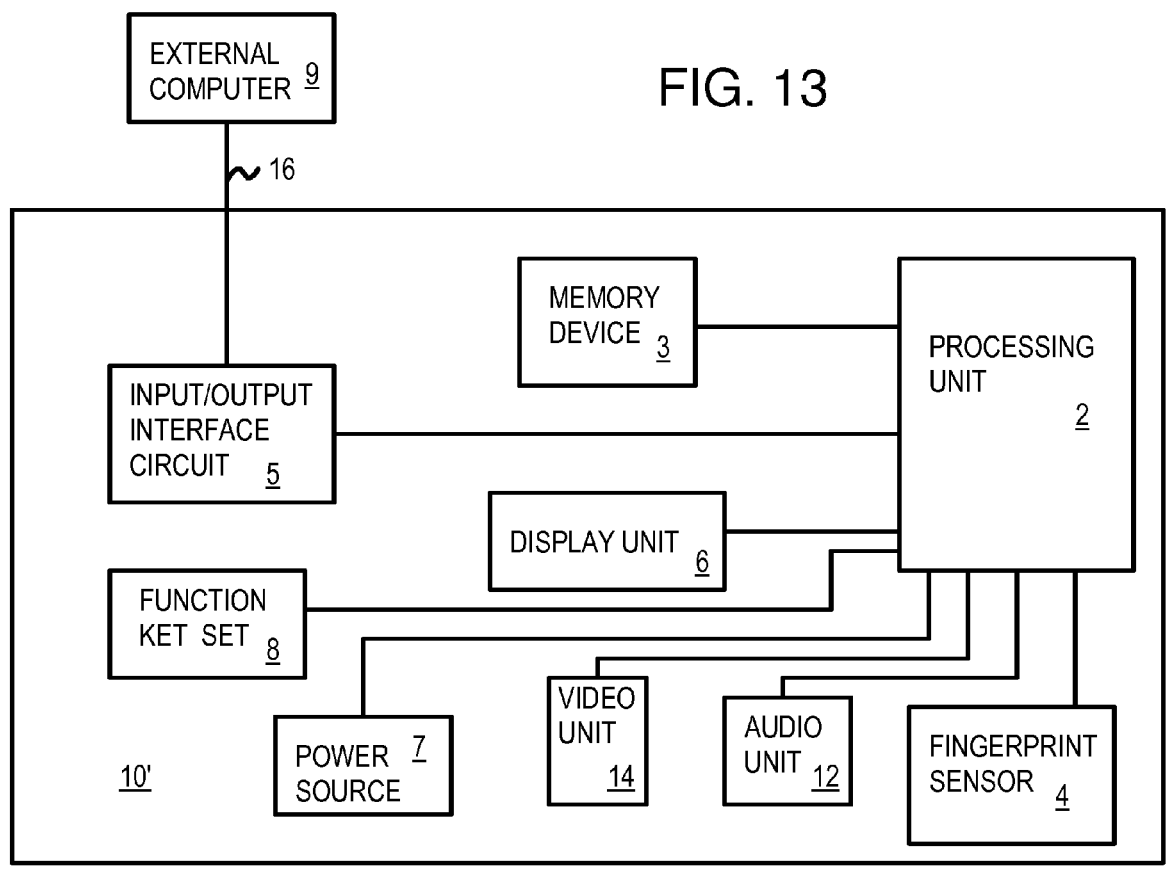
FIG. 13 shows an electronic data storage medium device with video, audio, and fingerprint scanning capability.

FIG. 13 shows an electronic data storage medium device with video, audio, and fingerprint scanning capability. Electronic data storage medium device 10 has audio capability and can function as MP3 player 32 described earlier.

Video unit 14 allows video files to be received from the license server and played as a video stream. Display unit 6 may display the video, or a jack can allow an external display device to be driven. The video stream may have both video and audio, and may use audio unit 4 or its own audio decoder.

Video files may use formats such as MPEG-4 and JPEG. Files of these formats are sent to video unit 14 for decoding and playback after decryption. When the decrypted file has an audio format, the decrypted file is sent to audio unit 12 rather than to video unit 14. Audio unit 12 and video unit 14 can share some functional blocks and could be merged together in some embodiments. Some functions may be performed by processing unit 2, or by special functional blocks such as encryption engines that could be shared by both audio unit 12 and video unit 14.

Electronic data storage medium device 10 can be accessed by external computer 9, and includes card body 1, processing unit 2, memory device 3, audio unit 4, input/output interface circuit 5, display unit 6, power source 7, and function key set 8 as described earlier for FIG. 2.

Processing unit 2 connects to other components and can operate in various modes, such as a programming mode, a data retrieving mode, and a data-resetting mode. Power source 7 supplies electrical power to processing unit 2. Function key set 8 allows the user to input a password that is verified by processing unit 2. Display unit 6 shows the operating status of the electronic data storage medium.

Fingerprint sensor 4 scans a fingerprint of a user to generate fingerprint scan data. The fingerprint scan can be used to verify a human user of the MP3 player. Theft of the MP3 player can be deterred since other users cannot use the MP3 player since their fingerprints would not match that of the authorized user.

Figure 14:
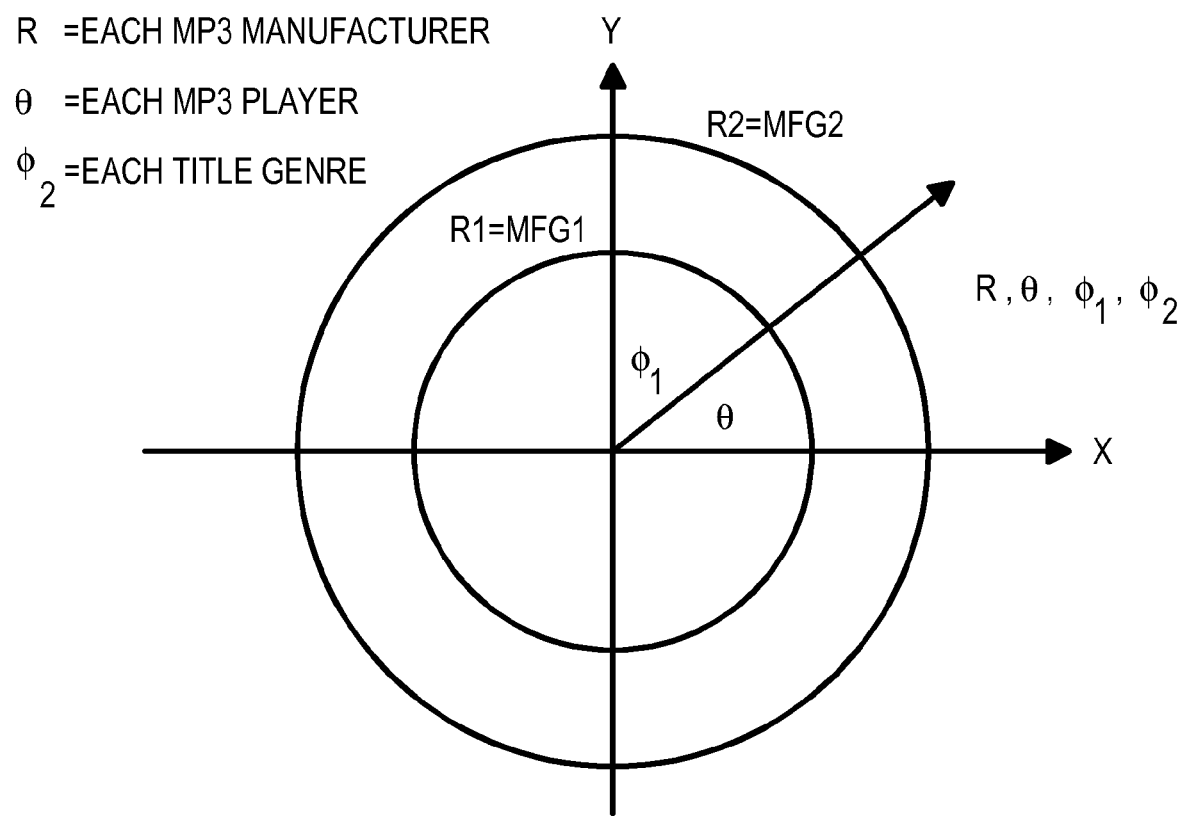
FIG. 14 shows a polar coordinate system for generating unique title keys to detect illegal copying.

FIG. 14 shows a polar coordinate system for generating unique title keys to detect illegal copying. Central license server 28 receives unique MP3 player ID 66 from each MP3 player 32 (FIG. 9) and generates a title key that is used to encrypt an audio file for downloading. The title key can be directly, indirectly, or un-related to unique MP3 player ID 66.

The license server can generate the title key as a direct function of the unique MP3 player ID 66. In the example of FIG. 14, a polar coordinate system is used to generate the title key as a function of the manufacturer of the MP3 player, the unique MP3 player ID, and the song title or the genre of the audio file.

In FIG. 14, the polar coordinate system is in three dimensions, with the third dimension not shown. Each radius value R is assigned to a different manufacturer of MP3 players. In three dimensions, each MP3 player manufacturer has a sphere assigned to it. All points on that assigned sphere are for MP3 players made by that manufacturer. Different manufactures have different spheres assigned, such as the outer sphere of radius R2 for manufacturer 2, and the inner sphere of radius R1 for manufacturer 1.

The unique MP3 player ID 66 is encoded as angle theta $\theta$, which is the angle from the positive X axis. The genre of the audio file being downloaded is encoded by the angle phi-2 ($\phi 2$), which is the angle from the plane of the X and Y axis to the coordinate on the spherical surface in the 3-dimensional space.

The polar coordinate R, $\Lambda$, $\phi 2$ represents one genre for one unique MP3 player for one manufacturer. This polar coordinate can be used as the title key, or as an input to a hash or encryption function that generates the title key. The title key is then used to encrypt the audio file being downloaded, and is also encrypted and sent to the MP3 player as part of the transfer key.

A genre may contain many songs. It may be preferable to have one title key for the entire genre of songs for each unique MP3 player. This minimizes generation of title keys by the license server. Another embodiment requiring more computing load on license server 28 is to have a different title key for each audio file. Then phi-2 $\phi 2$ is different for each audio file rather than for each genre. However, defining phi-2 as the genre can improve detection of illegal cloning of MP3 players since a larger group of songs will have the same polar coordinate.

When license server 28 receives too many requests with the same polar coordinate, there may be more than one user requesting these songs. For example, if one million requests are received by license server 28 that produce the same polar coordinate, all of these million requests would be for downloading the same genre of songs to the same MP3 player. Since a single MP3 player cannot store one million songs, and it would take over 4 years of 24/7 playing for one user to listen to a million songs, it is likely that his MP3 player has been cloned. Hundreds or thousands of users are using a cloned MP3 player that all have the same unique MP3 player ID 66.

Clones of MP3 player 32 can be detected by license server 28 when license server 28 receives requests from many different users with different IP addresses that all use the same unique MP3 player ID 66. License server 28 can then disable these accounts for the cloned devices. Likewise, when a user reports that his MP3 player has been stolen, license server 28 can disable the stolen device's unique MP3 player ID 66. While polar coordinates are not needed for this detection, polar coordinates can simplify detection, especially when the genre rather than the song title is encoded into the title key.

Alternate Embodiments

Several other embodiments are contemplated by the inventors. For example functions may be performed by hardware, software executed by the processing unit or by other units, firmware, or various combinations. Decoders could be added or modified to support other formats, such as a future MPEG-8 or MP8 format (or some other number or name) that might be developed in the future. The audio unit could have a receiver built-in, such as for receiving radio broadcasts over AM or FM or other bands. Other functions could be added to MP3 player 32, such as video, telephone, wireless Internet access, WiFi, Wii, an RF transceiver, etc.

A music player may include a controller for playing audio from MP3 data stored in the flash memory. An audio jack may be added to the device to allow a user to plug in headphones to listen to the music. A wireless transmitter such as a BlueTooth transmitter may be added to the device to connect to wireless headphones rather than using the audio jack. Infrared transmitters such as for IrDA may also be added. A BlueTooth transceiver to a wireless mouse, PDA, keyboard, printer, digital camera, MP3 player, or other wireless device may also be added. The BlueTooth transceiver could replace the connector as the primary connector. A Bluetooth adapter device could have a connector, a RF (Radio Frequency) transceiver, a baseband controller, an antenna, a flash memory (EEPROM), a voltage regulator, a crystal, a LED (Light Emitted Diode), resistors, capacitors and inductors. These components may be mounted on a printed-circuit board (PCB) before being enclosed into a plastic or metallic enclosure.

While audio files and decoding have been described, video files could also be substituted, or considered to be a superset of audio, since video often has an audio track. Still photos such as JPEG could also benefit from DRM and be processed in a similar fashion. MP3 player 32 could connect directly to the Internet, bypassing host PC 30 to reach license server 28, when MP3 player 32 can support modes that do not require a host PC.

Host keys and other keys could be generated only once, such as the first time the MP3 player is used, or more often, such as each time a new account is set up on a license server, or periodically, such as once per year, or after a command from the license server. Various intermediate values and encryption keys, or partial keys, may be used. The transfer key could include the content key and rules such as copy and usage rules that are concatenated together, or are combined by logical functions, hashing, or encryption.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A secure portable media player comprising:

an input/output interface circuit for connecting to a host network connected to a license server and for receiving an encrypted media file downloaded from the license server to the secure portable media player;

wherein the input/output interface circuit also receives a transfer key from the license server, the transfer key including a content key and copy rules for the encrypted media file;

a flash memory for storing the encrypted media file downloaded from the license server;

a decryptor that receives the encrypted media file and uses the content key to generate a media stream of playable media;

a media decoder for playing the media stream from the decryptor and generating an audio signal for generating audio heard by a user or generating a video display signal for generating a display visible to the user of the secure portable media player; and a processor for executing routines of instructions for activating the decryptor with the content key to unlock the media stream when copy rules for the encrypted media file have not been exceeded;

a unique media player identifier, stored on the secure portable media player, that has a different value for each secure portable media player;

wherein the input/output interface circuit transfers the unique media player identifier to the license server before receiving the encrypted media file downloaded from the license server to the secure portable media player, wherein the license server generates the content key as a function of polar coordinates of the unique media player identifier, a player manufacturer, and a song genre wherein the decryptor is disabled and prevented from generating the media stream when the copy rules have been exceeded, whereby copy rules are enforced by the secure portable media player.

2. The secure portable media player of claim 1 wherein the copy rules indicate when the encrypted media file is a copyrighted file, the copy rules also indicating a copy limit that indicates a number of times that the encrypted media file can be copied or can be played by the media decoder.

3. The secure portable media player of claim 2 further comprising:

a play decrementor, activated to decrement a play count when the decryptor generates the media stream from an encrypted media file;

a copy rule comparator that compares the play count from the play decrementor to the copy limit from the copy rules for the encrypted media file; and a play disabler that disables the decryptor and prevents generation of the media stream when the copy rule comparator indicates that the copy rules have been exceeded.

4. The secure portable media player of claim 3 further comprising:
a fingerprint sensor on the secure portable media player for scanning a fingerprint of the user of the secure portable media player;
a fingerprint comparator for comparing a current scan from the fingerprint sensor to a stored scan of a fingerprint in a security register;
wherein the play disabler disables the decryptor and prevents generation of the media stream when the fingerprint comparator does not match the current scan to the stored scan,
whereby fingerprint scanning secures the secure portable media player from use by an unauthorized user.

5. The secure portable media player of claim 2 wherein the flash memory stores encrypted media files and does not store the media stream generated by the decryptor,
whereby decrypted media streams are not stored.

6. The secure portable media player of claim 2 further comprising:
a key decryptor, receiving the transfer key from the input/output interface circuit, for generating the content key and the copy rules by decrypting the transfer key using an internal key;
whereby the transfer key is encrypted.

7. The secure portable media player of claim 6 wherein the internal key is generated from a unique player identifier for the secure portable media player that is unique for each copy of the secure portable media player.

8. A digital rights management (DRM) system for a portable media player comprising:
input/output interface circuit means for connecting to a host;
processor means for executing instructions;
memory means for storing an encrypted media file received by the input/output interface circuit means;
decrypt means for decrypting the encrypted media file to generate playable media;
decoder means for generating signals representing the playable media from the decrypt means;
function key means for receiving inputs from a user to control operation of the processor means;
display means for displaying control information to the user generated by the processor means;
audio means, receiving the signals from the decoder means, for generating audible sounds to the user representing the playable media and encrypted in the encrypted media file;
counter means for tracking a usage limit of the encrypted media file;
disable means for disabling the decrypt means when the counter means indicates that the usage limit has been reached for the encrypted media file;
host computer means, removably coupled to the input/output interface circuit means by a local bus, for connecting to a license server on a public network to download the encrypted media file from the license server;
wherein the input/output interface circuit means transfers the unique media player identifier to the license server before receiving the encrypted media file downloaded from the license server to the portable media player;
wherein the license server uses the unique media player identifier to generate the content key;
wherein the license server generates the content key as a function of polar coordinates of the unique media player identifier, a player manufacturer, and a song genre
whereby the unique media player identifier is sent to the license server to uniquely identify the portable media player before downloading and whereby usage of the encrypted media file is disabled when the usage limit is reached.

9. The DRM system for a portable media player of claim 8 further comprising:
transfer key means, received over the input/output interface circuit means, for carrying the usage limit and a content key for the encrypted media file;
wherein the content key is sent to the decrypt means for use as an encryption key to decrypt the encrypted media file to generate the playable media.

10. The DRM system for a portable media player of claim 9 further comprising:
transfer-key decryption means for using a player key to decrypt the transfer key means received over the input/output interface circuit means to recover the usage limit and the content key.

11. The DRM system for a portable media player of claim 10 further comprising:
further comprising:
unique player identifier storage means for storing a unique media player identifier, wherein the unique media player identifier has a different value for each portable media player;
wherein the player key is the unique media player identifier or is generated from the unique media player identifier.

12. The DRM system for a portable media player of claim 10 further comprising:
host computer means, removably coupled to the input/output interface circuit means by a local bus, for connecting to a license server on a public network to download the encrypted media file from the license server;
host computer identifier means for storing on the host computer means a unique host identifier, wherein the unique host identifier has a different value for each host computer means; and
player key generator means, receiving the unique host identifier, for generating the player key as a function of the unique host identifier.

13. The DRM system for a portable media player of claim 12 further comprising:
personal identifier means, in the host computer means, for generating a personal identifier from the unique host identifier;
attachment means, in the host computer means, for attaching the personal identifier to a tag in the encrypted media file during downloading to the portable media player,
whereby media files downloaded are tagged with the personal identifier generated by the host computer means.

14. The DRM system for a portable media player of claim 13 further comprising:
personal identifier validate means, in the portable media player, for reading and validating the personal identifier tagged in the encrypted media file, and for activating the disable means when the personal identifier tag is not valid.

15. A method for managing digital rights on a portable media player comprising:
sending a unique player identifier for the portable media player to a license server through a host computer;
wherein the unique player identifier has a different value for each portable media player;

receiving from the host computer an encrypted media file that was encrypted by the license server using a title key;

receiving from the host computer an encrypted title key that is the title key encrypted by the license server using the unique player identifier;

decrypting the encrypted title key on the portable media player using the unique player identifier of the portable media player to generate a recovered title key;

decrypting the encrypted media file on the portable media player using the recovered title key to generate playable media;

decoding the playable media to generate audio signals for generating audible sounds to a user of the portable media player; and detecting illegal cloning of the portable media player by:

the license server generating the title key as a function of polar coordinates of the unique player identifier, a player manufacturer, and a song genre for a song in the encrypted media file;

identifying a plurality of requests with a same polar coordinate, wherein the plurality of requests exceeds a threshold number of requests;

disabling downloading of encrypted media files for the same polar coordinate when the plurality of requests exceeds the threshold number of requests;

whereby cloning is detected by the same polar coordinate with requests exceeding the threshold number of requests.

16. The method of claim 15 further comprising:

receiving on the host computer from the license server an encrypted copy rule that is a copy rule encrypted by the license server using a title key;

wherein the copy rule indicates a number of allowed copies of the encrypted media file;

decrypting the encrypted copy rule on the host computer using the unique player identifier to generate a recovered copy rule;

adjusting a copy counter on the host computer for each copy of the encrypted media file downloaded to the portable media player or to another portable media player connected to the host computer; and comparing the copy counter to the recovered copy rule on the host computer and disabling downloading of the encrypted media file from the host computer to the portable media player when the recovered copy rule is violated.

* * * * *